United States Patent [19]

Cowling

[11] Patent Number: 5,295,051
[45] Date of Patent: Mar. 15, 1994

[54] ILLUMINATING APPARATUS

[75] Inventor: Ian R. Cowling, Queensland, Australia

[73] Assignee: Queensland University of Technology, Brisbane, Australia

[21] Appl. No.: 838,216

[22] PCT Filed: Sep. 7, 1990

[86] PCT No.: PCT/AU90/00408
§ 371 Date: Apr. 8, 1992
§ 102(e) Date: Apr. 8, 1992

[87] PCT Pub. No.: WO91/03682
PCT Pub. Date: Mar. 21, 1991

[30] Foreign Application Priority Data

Sep. 8, 1989 [AU]   Australia ................................ PJ6274

[51] Int. Cl.$^5$ .............................................. F21V 7/04
[52] U.S. Cl. ..................... 362/32; 362/145; 359/595; 359/598
[58] Field of Search ...................... 362/31, 32, 145; 359/595, 598

[56] References Cited

U.S. PATENT DOCUMENTS

| | | | |
|---|---|---|---|
| 607,792 | 7/1898 | Winger | 359/595 |
| 721,256 | 2/1903 | Wadsworth | 359/595 |
| 2,546,335 | 3/1951 | Friend | 359/596 |
| 4,634,222 | 1/1987 | Critten | 359/596 |
| 4,699,467 | 10/1987 | Bartenbach et al. | 359/592 |

FOREIGN PATENT DOCUMENTS

| | | |
|---|---|---|
| 2471188 | 5/1990 | Australia . |
| 287729 | 1/1928 | United Kingdom . |
| 2220025 | 12/1989 | United Kingdom . |

OTHER PUBLICATIONS

Ruck N. "Beaming Daylight Into Deep Rooms" Building Research and Practice May–Jun. 1985, p. 144.
Ruck N. and Smith S. "Solar Beam Lighting using a Prismatic Panel" Proceedings of the Windows in Building Design and Maintenance Conference, Goteborg, Sweden, Jun. 1987.
Critten D. "Light Enhancement Using E-W Aligned Long Prismatic Arrays at High Latitude" Solar Energy, vol. 41, No. 6, 1988.
Whitehead L., Brown D and Nodwell R. "A New Device for Distributing Concentrated Sunlight in Building Interiors" Energy and Buildings 6 p. 119. 1984.
Howard T. et al. "Variable-area, Light Reflecting Assemblies" Proceedings of the International Daylighting Conference, Long Beach, Calif. Nov. 1986.

*Primary Examiner*—Stephen F. Husar
*Attorney, Agent, or Firm*—Amster, Rothstein & Ebenstein

[57] ABSTRACT

There is provided illuminating apparatus including an illuminating channel 10 defined between an incident surface 11, an emergent surface 12, an upper surface 13 and a lower surface 14. The upper surface 13 includes end portions 15 which may be adhered to the lower end portions 16 of an adjacent illuminating channel. The portion of the upper surface 13 between the end portions 15 comprises a steeply inclined outer portion 17, a horizontal central portion 20 and a shallow inner inclined portion 21. Light entering the incident face 31 at a low angle of incidence is reflected by total internal reflection in turn from the lower outer surface 32 of a first cavity 33, the central portion of the upper surface 34 of a second cavity 35, and then the inner lower surface 36 of the first cavity 33 before emerging from the emergent face 37. Light entering the incident face 31 at a medium angle of incidence is refracted at the incident face to a lower angle of refraction such that most incident light is reflected from locations distributed along the upper surface 40 of the cavity 41. Light entering the incident face 31 at a high angle of incidence is refracted to a lower angle such that most incident light falls on the outer end of the upper surface 42 of the cavity 43, such that the light rays are deflected through an angle sufficient for them to emerge from the emergent face 37 diffused and approximately perpendicular to the latter.

9 Claims, 15 Drawing Sheets

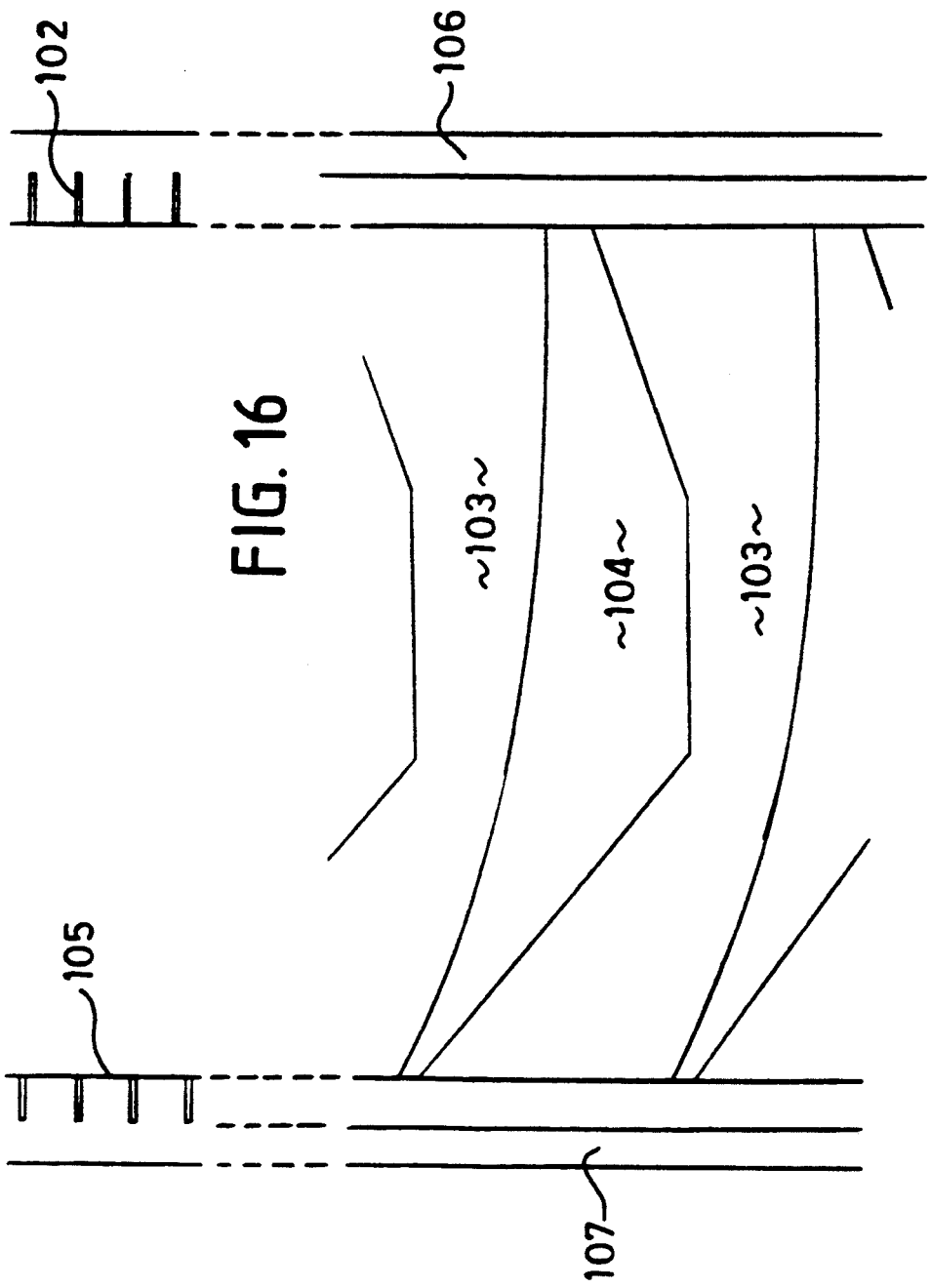

ILLUMINATING APPARATUS

This invention relates to illuminating apparatus.

This invention has particular but not exclusive application to enhancing natural lighting within buildings, and for illustrative purposes reference will be made to such application. However, it is to be understood that this invention could be used in other applications, such as diffusers or concentrators for artificial lights, or as greenhouse panels.

Conventional windows permit incident light to pass into a building with its direction essentially unchanged. As the angle of incidence at which natural sun light falls on a window varies with time of day and the season, the light tends to fall in patches which move around the room, resulting in localised areas which are periodically overilluminated and deeper areas which must be illuminated artificially. The presentation of natural light in such an inconvenient form has led to the design of buildings in which most of the natural light is excluded by reflective windows, dark glass and blinds, with even illumination within the room being provided by power-consuming lights.

In has been recognized that it is desirable to redirect some of the incident sunlight through windows from its generally downwards path to an upward path, whereby the light may be reflected off the ceiling and/or high on a back wall to increase illumination deeper in the building. Attempts have been made to redirect incident light through a window by the substitution of reflectors within the window opening. However, reflectors proposed for use have suffered from the inherent disadvantage that the light so dealt with has emerged from the reflectors as a beam resulting in glare and other distractions not conducive to visual comfort. To date, such efforts have not met with commercial success as they have not been able to redirect and diffuse the light satisfactorily.

Other proposed means of achieving the desirable end of channelling incident sunlight and skylight include simple and complex light shelves, the complexities of the more efficient light shelves having specially structured surfaces making them uneconomic to manufacture. Additionally, prior art redirection apparatus suffers from considerable optical losses which tends to reduce the amount of light redirected, particularly when the light is skylight rather than the more intense direct sunlight. Consequently, prior art redirection apparatus has found only limited application, such as on the north side of buildings in the southern hemisphere.

A further major problem of prior art designs includes a failure to operate effectively over a wide range of angles of incidence of the incoming sunlight, resulting in the need for complex, expensive and inconvenient adjustment apparatus. Apparatus which is not adjustable or adjusted correctly results in the light being reflected in inappropriate directions, resulting in problems ranging from overillumination of the ceiling near the window wall of the building to transmission of unacceptable levels of glare.

The present invention aims to alleviate the above disadvantages and to provide illuminating apparatus which will be reliable and efficient in use. Other objects and advantages of this invention will hereinafter become apparent.

With the foregoing and other objects in view, this invention in one aspect resides broadly in illuminating apparatus for transmitting incident light and including:

a body member formed of a light-transmitting material;

an incident surface provided on said body member; and a reflective surface associated with said body member so as to reflect refracted light whereby incident light may be refracted and reflected through said body member to emerge from said body member in a diffused pattern.

Preferably, the reflective surface comprises a pair of reflective surfaces of the body member, wherein the pair of reflective surfaces define a light guide within the body member such that light refracted through the incident surface is transmitted through the light guide and emerges from the light guide in a diffused pattern. Preferably, the reflective surfaces are interfaces between the light-transmitting material and a material of different refractive index such as air, such reflection is totally internal resulting in no special mirror coatings being necessary. Of course, if desired, other forms of reflective surface such as reflective coatings or metallic surfacing may be used, or alternatively the reflective surfaces may comprise the boundary between the body member and a solid, reflective member to provide a monolithic illuminating apparatus.

The reflective surfaces may be curved in two or more dimensions such that operative functioning may occur with changes in any direction in the incidence angle for incoming light. It is preferred, however, that the reflective surfaces be of constant profile along the illuminating apparatus such that the cavities formed are prismatic for simplicity of manufacture and assembly.

A plurality of illuminating apparatus may be assembled to form an illuminating assembly. Suitably, a first one of the reflective surfaces associated with one illuminating apparatus and a second one of the reflective surfaces associated with an adjacent illuminating apparatus may form opposed sides of a cavity formed between the illuminating apparatus for simplicity of manufacture and to seal the reflective surfaces from environmental degradation.

Suitably the illuminating assembly is formed as a constant-profile extrusion in the form of a sheet, wherein the individual illumination portions thereof are formed integrally adjacent the incident and emergent surfaces such that an illuminating assembly may be formed having substantially continuous incident and emergent surfaces. Suitably, the reflective surfaces are curved or formed with flat portions inclined to one another such that light falling on the incident surface at a low angle of incidence, that is, substantially perpendicular to the incident surface, may be reflected alternately from opposed reflective surfaces to be emitted through the emergent surface, while light falling on the incident surface at a higher angle of incidence may be reflected by one of the reflective surfaces such that the light may emerge at a low and diffused angle at the emergent surface.

The reflective surfaces may be formed by the application of suitable coatings, or may function by total internal reflection from the interface between the air space and the optically-transparent material.

Suitably, the inclination of the reflective surfaces is arranged such that the light which is incident onto the reflective surfaces has an angle of incidence which is within the range for which total internal reflection occurs.

Accordingly, in another aspect, the present invention resides broadly in light transmission apparatus including an optical waveguide having a light incident surface, a light emergent surface and substantially opposed side surfaces, the shape of said opposed side surfaces being selected such that:

(1) substantially all light entering said incident surface and striking said opposed side surfaces is transmitted to said emergent surface by total internal reflection, and (2) the light so transmitted exits said emergent surface at an angle substantially independent of the angle of incidence at said incident surface.

Preferably, the optical waveguide comprises a unitary body of dielectric material such as glass, clear polymer or any other material having a high coefficient of transmission for white light frequencies. The incident and emergent surfaces are preferably plane and parallel such that the apparatus may replace a standard window, wherein the incident surface is directed to the outside of a building to accept incident sunlight and/or skylight.

In preferred embodiments of the present invention, the dielectric material is selected such that, for angles of incidence from 0° to 70°, light rays refract into the waveguide and for angles of incidence greater than 70°, light is reflected away from the waveguide. Of course, should a greater or different range of incident angles be required, the dielectric may be so selected and/or coating or surface layers provided such that incident light of greater than 70° is transmitted.

In the embodiments of the invention intended for use in place of a conventional window, it may be advantageous to select the dielectric material and shape of the reflective surfaces such that light of incidence of from about 20° to 0° incidence passes through without redirection, whereas light at incidence of from about 20° to 70° is diffused inwardly and upwardly within the room.

In a further embodiment of this invention, the incident and emergent surfaces of the illuminating apparatus are formed on respective prisms or truncated prisms, the prisms being separated by an air space confined between a pair of reflective surfaces which may be curved or segmented such that for reflecting incoming light into a desired direction.

In another aspect, this invention resides in a method of transmitting light, including:

providing a plurality of illuminating channels, each said illuminating channel being formed from a light-transmitting material and extending between an incident surface and an emergent surface, said illuminating channel being confined between a pair of reflective surfaces such that light incident on said incident surface may be reflected from one or both of said reflective surfaces to emerge from said emergent surface in a diffused pattern.

Apparatus in accordance with the present invention may have other applications besides its use in a vertical window aperture. For example, apparatus may find use in an approximately horizontal orientation, for example as a skylight, all or part of a pagoda roof, other sloped, light transmitting roof portion or as a cover for an artificial light to redirect the light in a particular way.

The apparatus described above all include a constant transmission factor. As light enters and leaves the module there will occur small reflection losses, and in addition there will be a transmission loss within the dielectric due to absorption. These losses will vary slightly for different incident angles and points of entry into the apparatus but generally the amount of light transmitted through the apparatus into the room is largely dependent upon the intensity of the incident light onto the apparatus.

Thus if very bright sunlight was shining directly onto the window then much more light would be transmitted into the room than if it were just diffuse light incident on the apparatus. The apparatus however may be modified to control to some extent the amount of the light passing through it into the room, thus providing the opportunity to control the amount of daylight entering the room and hence provide a more uniform illuminance, irrespective of the intensity of light incident on the apparatus.

For example, the apparatus may be provided with a reflecting or absorbing insert disposed within the dielectric material and adapted to reduce the amount of light passed. Preferably, the insert is disposed in the narrowed portion of the preferred apparatus, the space for the insert being preferably provided by a split or groove in the dielectric material. The split or groove may be parallel to the incident and or emergent surfaces of the apparatus, or alternatively may be inclined thereto. Where the space provided divides the apparatus, the separate parts may be provided as before in individual sections or in sheet form comprising a plurality of sections.

In the space between the two parts of a section a solid reflecting or absorbing material may be free to move through the gap. Preferably, the material comprises a suitable substrate provided with a metallized surface or a film applied to the surface thereof.

There may be one piece of such material for each section of multiple element apparatus or alternatively the sections may be selectively provided. Preferably, the height of the reflecting or absorbing insert may be approximately the same as the height of the dielectric at that point, and is preferably no greater than the size of the air gap between each adjacent section. Each piece of reflecting or absorbing material may be attached to the piece above to form a blind assembly. The means of attachment can be via wires or chords spaced along the length of each piece of material, so maintaining a constant distance between each adjacent piece. Alternatively attachment could be by means of a solid but transparent material between each adjacent piece. In either case the space between each piece of reflecting or absorbing material is preferably highly transparent to light passing from the incident side to the emerging side of the apparatus.

This blind may be able to be raised or lowered an amount equivalent to height of the dielectric at that point so that at one extreme the material completely blocks the region between the two dielectric parts making up a section and at the other extreme of its motion it lies within the air-gap between adjacent sections. In the former position light passing through a section as before emerges from the first part at the split and may be almost totally reflected or absorbed by the blind material and very little passes into the other part of the section to finally emerge into the room as with the previously described apparatus. When the blind resides totally in the air-gap between sections all light preferably passes across the gap between the two parts and continues on as before into the room.

The blind is preferably adjustable across a range of positions between these two extremes, hence allowing some of the light to be reflected or absorbed by the blind material and some to pass unhindered across the gap and on into the room. The further the blind extends into the space between each part, the less light is able to be transmitted through the apparatus.

The movement of the blind assembly controlling the relative position of the material may be manual or automatically controlled. In this latter case a particular light transmission level through the apparatus may be pre-set. The light passing through a section of the apparatus may be monitored by any suitable monitoring means and the output of the monitoring means be utilized to operate drive means to drive the blind assembly into or out of the gap until the light transmission matched the pre-set level.

The direction of travel of light entering any aperture such as a window can be resolved into two independent components at right angles to each other. The first component may be in the stacking direction of the apparatus and the second may be in the plane of a single section. In the case of a vertical window aperture, the first component would be in the vertical direction and could be defined in terms of an elevation angle from the horizontal, which would also be the normal to the window. The second component would then be in the horizontal direction and this could be defined in terms of the oblique angle, measured horizontally from the normal.

In the case of a north-facing window in the southern hemisphere, the sun would move across the window from east to west each day. Its direction to each side during the morning and afternoon is the oblique angle, while its height above the horizon at each point as it follows this path is the elevation. The apparatus described thus far has primarily been directed to redirecting the elevation component of the incident light to a preferably horizontal-to-upward path inside the room. The component of the incident light in the plane of each section does undergo refraction during its passage through the section of a apparatus but the light emerges with approximately the same angle in this plane and no attempt is made to vary this angle.

Accordingly, in a further aspect, apparatus is contemplated that, addition to its action on the elevation component of the incident light, redirects some of oblique angle rays as they pass through each section of the apparatus. This results in the light entering the room over a range of angles in the oblique direction, as well as in the elevation direction as achieved with the previously described apparatus. This may be achieved either before light enters the region between the air-gaps bounding each section or after the light has left this region and is traveling to the emerging surface. For example, fine, vertical grooves may be cut on the inner part of a plane sheet provided to form the outer incident surface of a window-replacing multiple element or integrally formed sheet apparatus in accordance with the present invention. Of course, the grooves may additionally or alternatively be associated with the emergent surface of the apparatus.

The grooves may have straight edges or preferably be curved so the width of the groove is greatest near the air-gaps of the preferred multiple element apparatus. Any light passing through the dielectric and coming to the groove interface will be totally internally reflected if its angle of incidence is to be greater than the critical angle. With the orientation of the grooves running in the elevation direction of the apparatus, this reflection will change the oblique angle of travel of the light. Some light rays will pass through this section without striking these grooves. The number, spacing and depth of the grooves determines the fraction of incident light that will be redirected by the grooves, and this fraction will increase as the oblique angle of incidence becomes larger.

In order that this invention may be more easily understood and put into practical effect, reference will now be made to the accompanying drawings which illustrate a preferred embodiment of the invention, wherein:

FIG. 16 is a plan view of apparatus in accordance with the present invention and capable of utilizing the oblique component of incident light.

FIG. 17 is a partial end elevation of the apparatus of FIG. 16.

Figure 1:
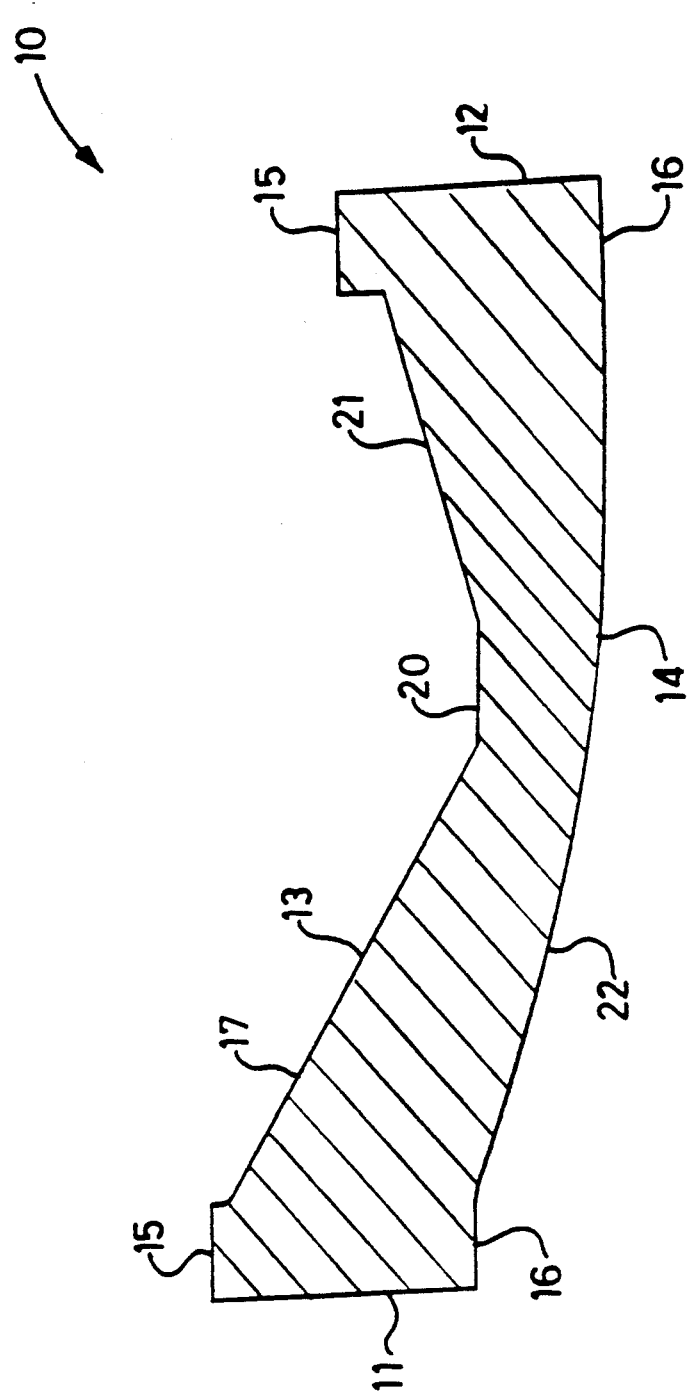
FIG. 1 and 2 are cross-sectional views of an illuminating channel according to the invention.
Figure 2:
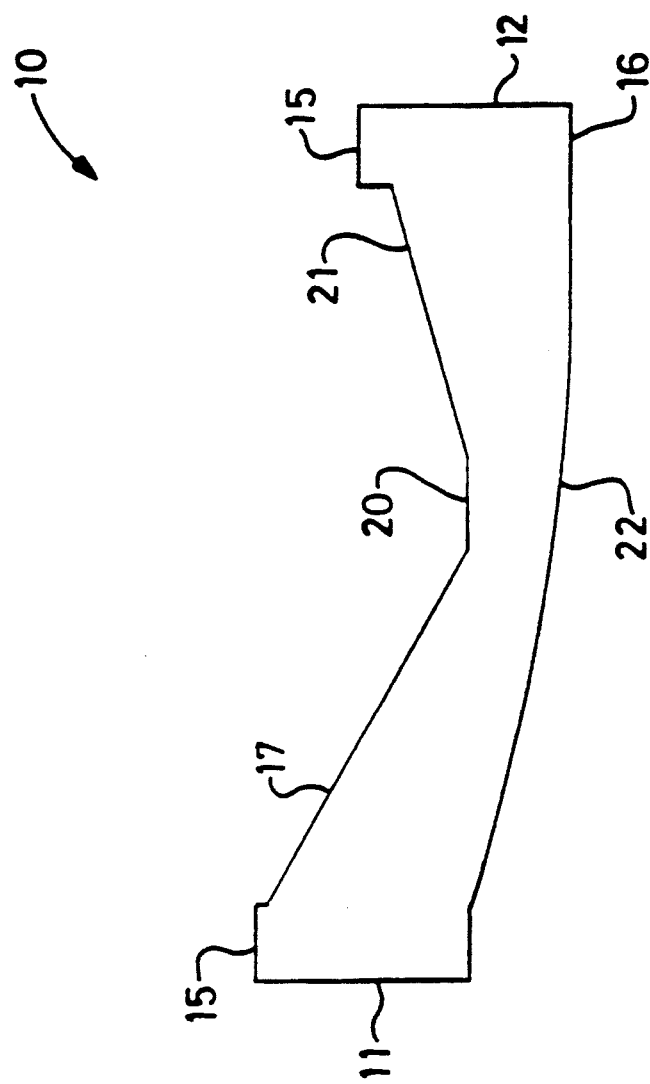

The illuminating channel 10 shown in FIGS. 1 and 2 is prismatic in form and is contained between a flat incident surface 11, a flat emergent surface 12, an upper surface 13 and a lower surface 14. The upper surface 13 includes end portions 15 which may be adhered to or formed integrally with the lower end portions 16 of an adjacent illuminating channel. The portion of the upper surface 13 between the end portions 15 comprises a steeply-inclined outer portion 17, a horizontal central portion 20 and a shallow inner inclined portion 21. The portion 22 of the lower surface 14 between the lower end portions 16 is part of a cylinder with its axis disposed adjacent the plane containing the emergent surface 12.

FIG. 2 also illustrates the proportions of one element of apparatus of the present invention, which would also be appropriate for a portion of integral apparatus, wherein dimensionless decimal numbers are units of length and degrees of angle are as illustrated.

Figure 3:
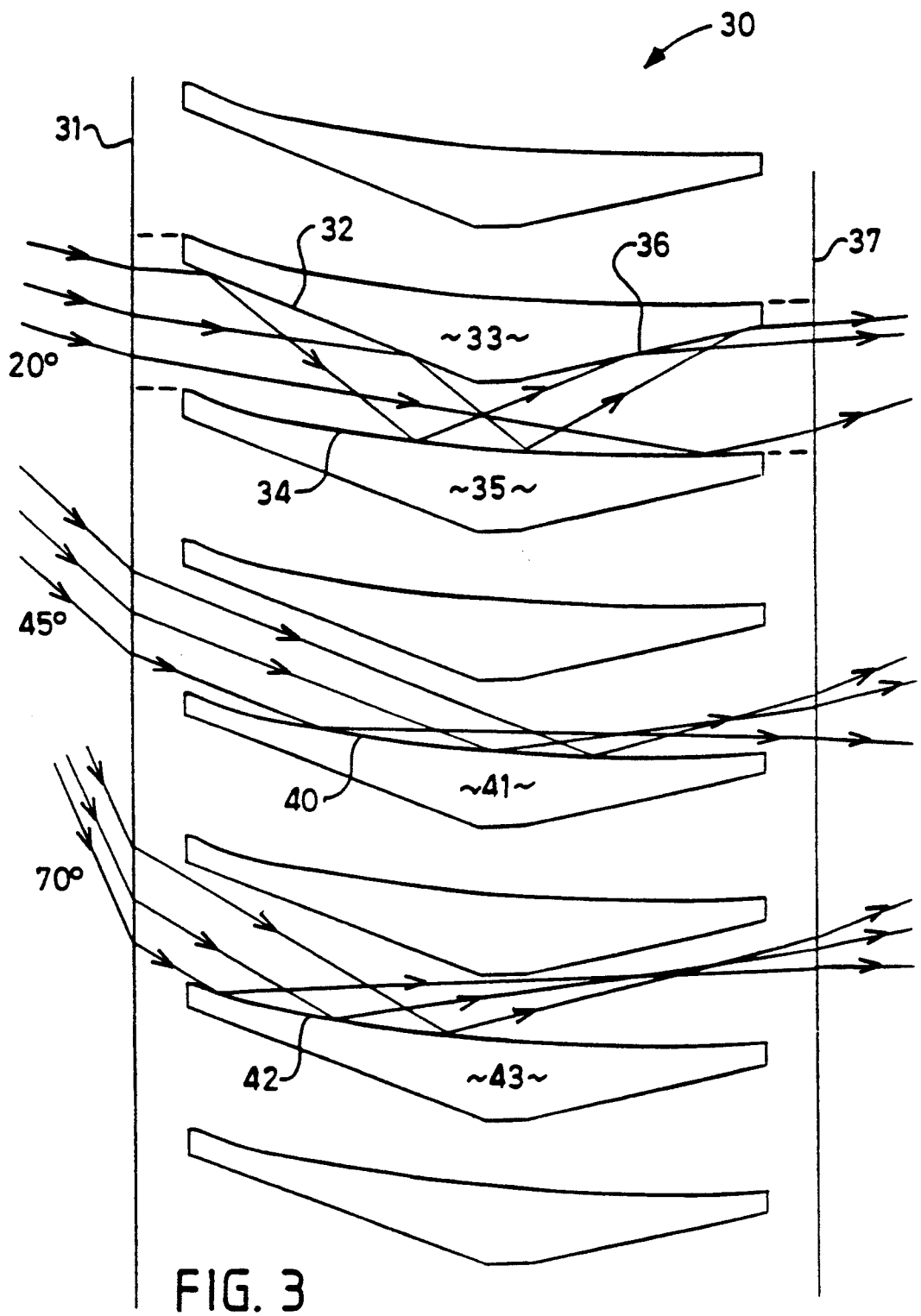
FIG. 3 is a cross-sectional view of an illuminating apparatus according to the invention.

A plurality of illuminating channels 10 may be adhesively bonded together to form an illuminating assembly 30 as shown in FIG. 3, or alternatively the assembly may be extruded or cast in sheet form. Light entering the incident face 31 at a low angle of incidence such as twenty degrees is reflected by total internal reflection in turn from the lower outer surface 32 of a first cavity 33, the central portion of the upper surface 34 of a second cavity 35, and then the inner lower surface 36 of the first cavity 33 before emerging from the emergent face 37 diffused and substantially perpendicular to the latter. Some light at such an angle of incidence also grazes the inner end of the upper surface 34 to emerge at a slightly different angle to its entry angle.

Light entering the incident face 31 at a medium angle of incidence such as forty-five degrees is refracted at the incident face to a lower angle of refraction such that most incident light is reflected from locations distributed along the upper surface 40 of the cavity 41. As this surface is slightly curved, light entering at different locations down the illuminating assembly 30 emerge from the emergent face 37 at differing angles, providing a diffuse light approximately perpendicular to the emergent face 37.

Light entering the incident face 31 at a high angle of incidence such as seventy degrees is refracted to a lower angle such that most incident light falls on the outer end of the upper surface 42 of the cavity 43. As this end of the upper surface 42 has the greatest inclination, the light rays are deflected through an angle sufficient for them to emerge from the incident face 37 diffused and approximately perpendicular to the latter.

Figure 4:
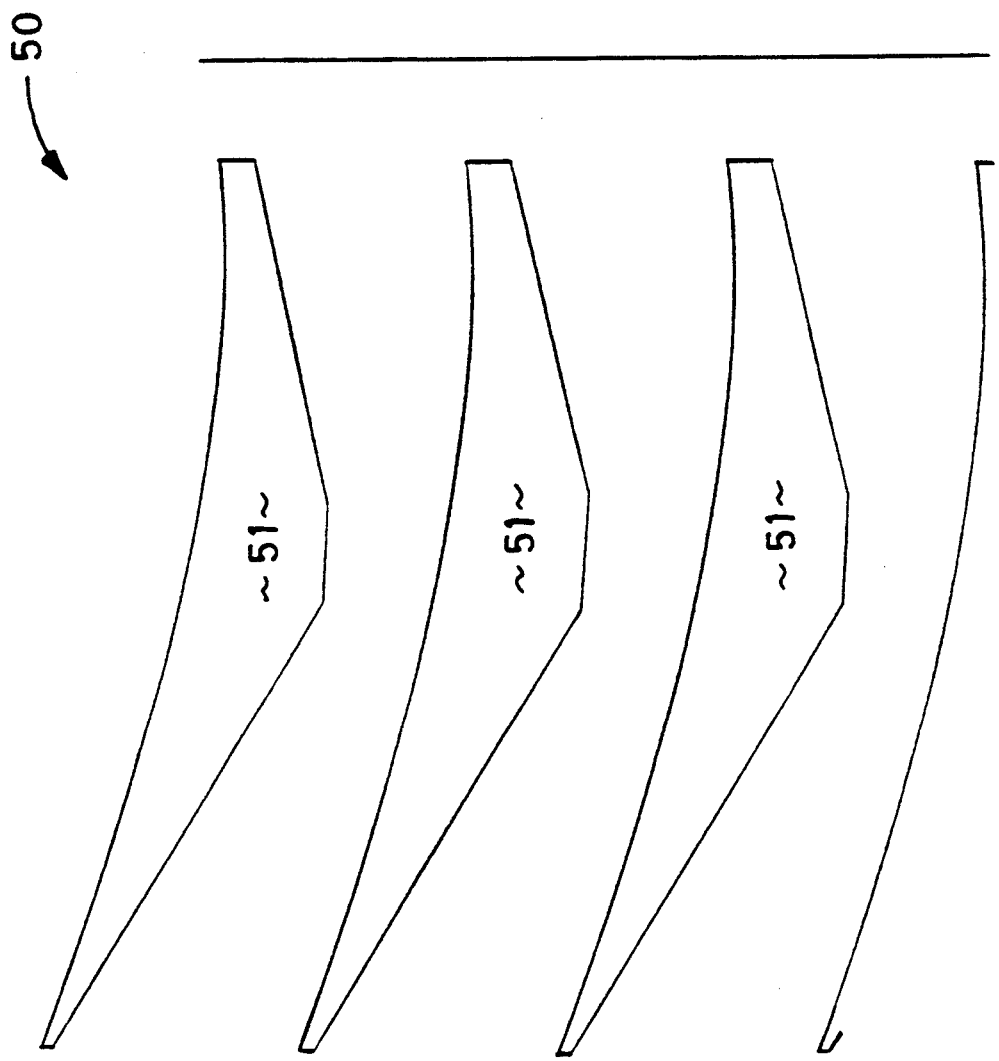
FIGS. 4, 5 and 6 are cross-sectional views of further illuminating apparatus according to the invention.
Figure 5:
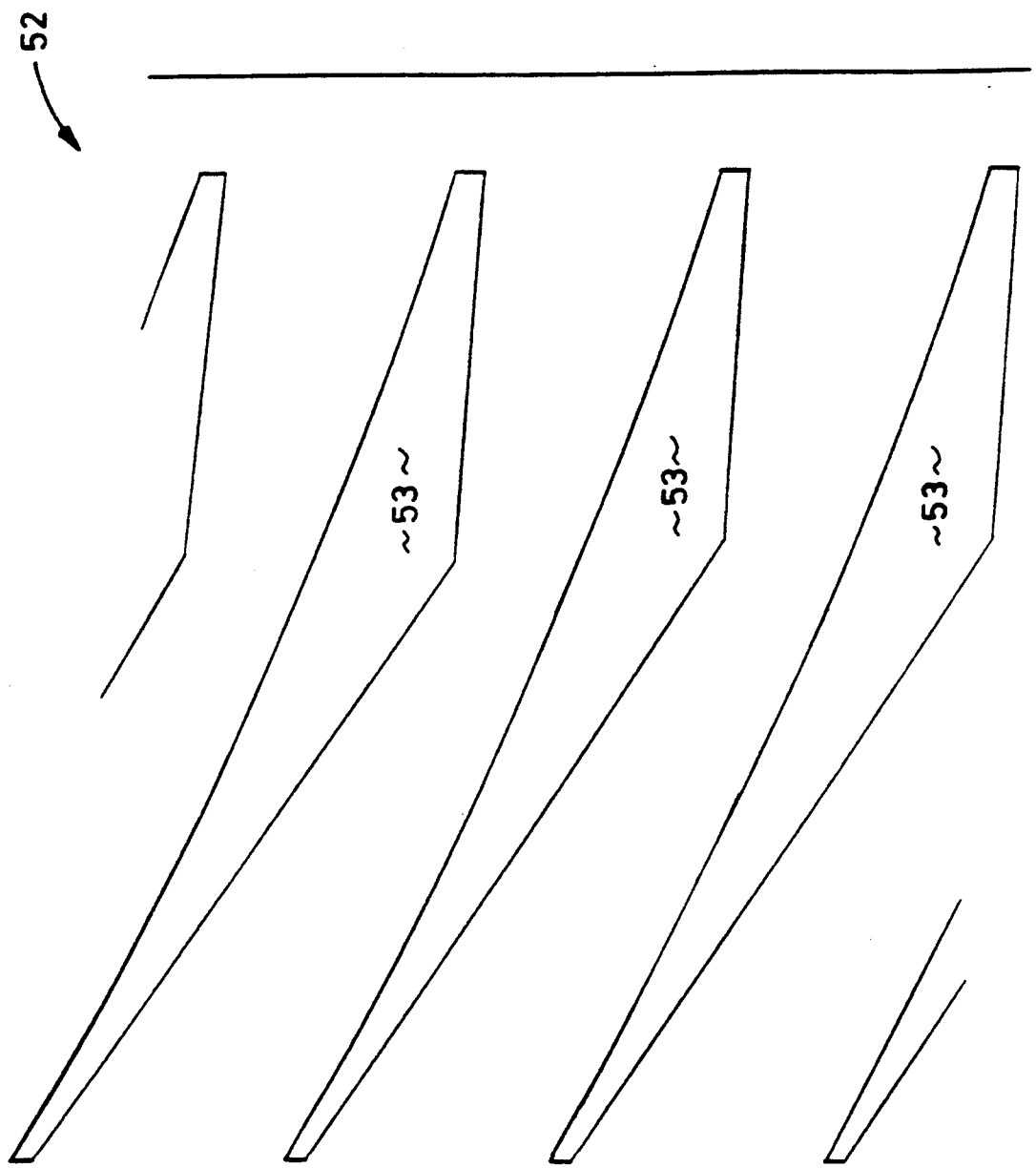
Figure 6:
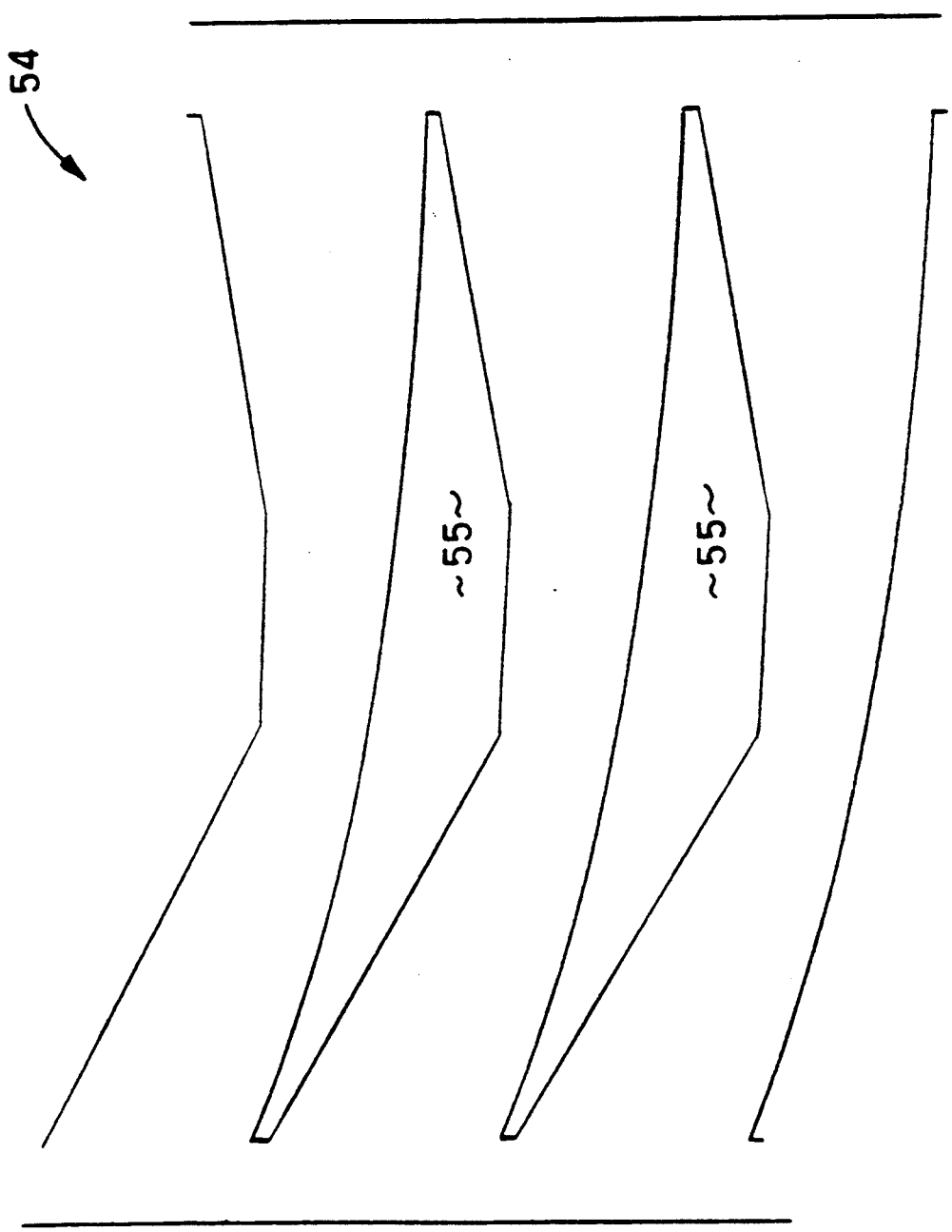

The illuminating assemblies 50, 52 and 54 shown in FIGS. 4, 5 and 6 show alternative geometries for the air cavities 51, 53 and 55 to provide optimised performance for different ranges of angle of incidence and different ranges of light emergent angles.

Figure 7:
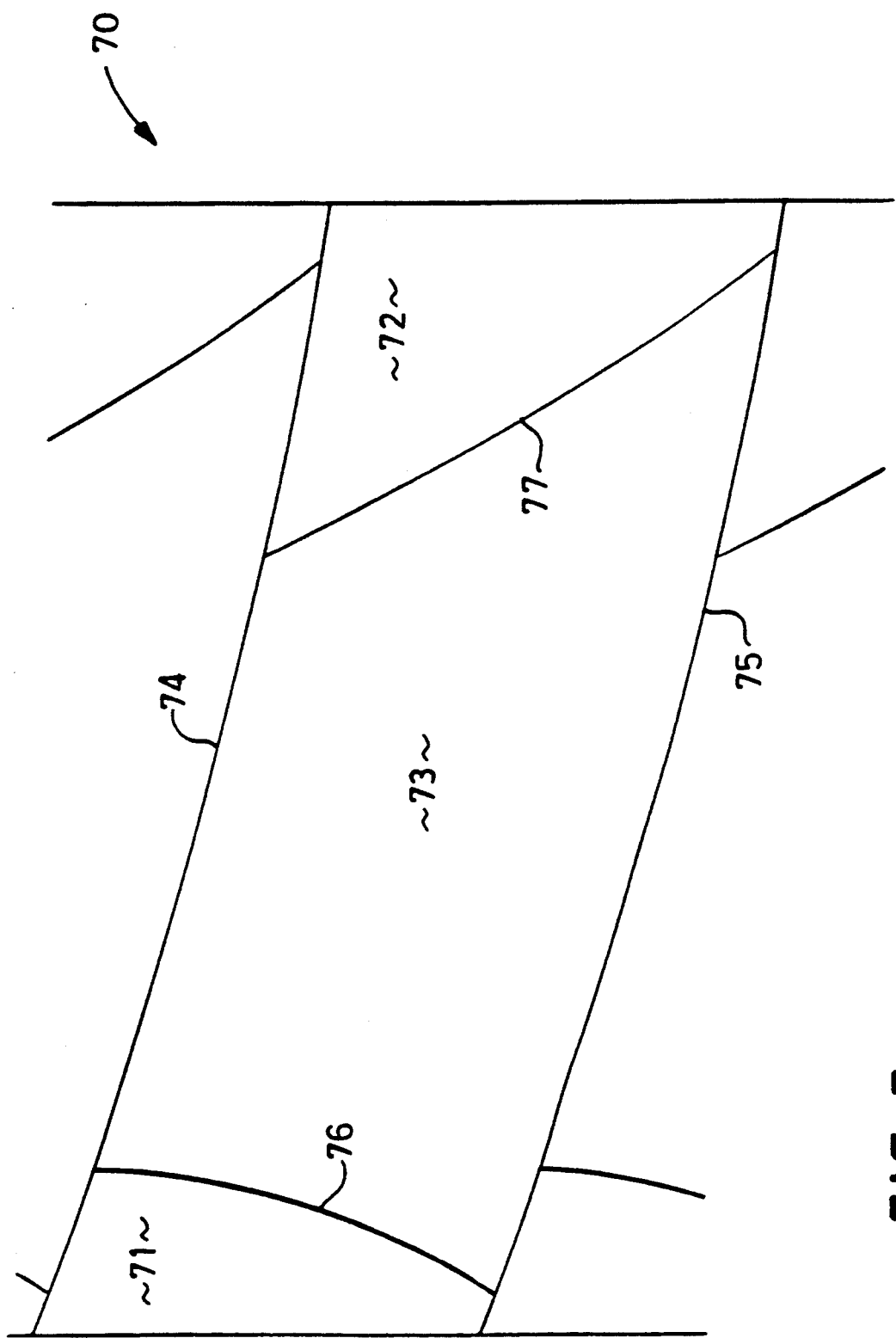
FIGS. 7 and 8 are cross-sectional views of a further embodiment of an illuminating apparatus.

The illuminating channel 70 shown in FIG. 7 comprises an incident prism 71 and an emergent prism 72. An air cavity 73 is formed between the prisms 71 and 72, an upper reflective surface 74, and a lower reflective surface 75, both of which are curved about axes normal to the section shown. The inner face 76 of the incident prism 71 and the inner face 77 of the emergent prism 72 are also curved about axes normal to the section shown.

Figure 8:
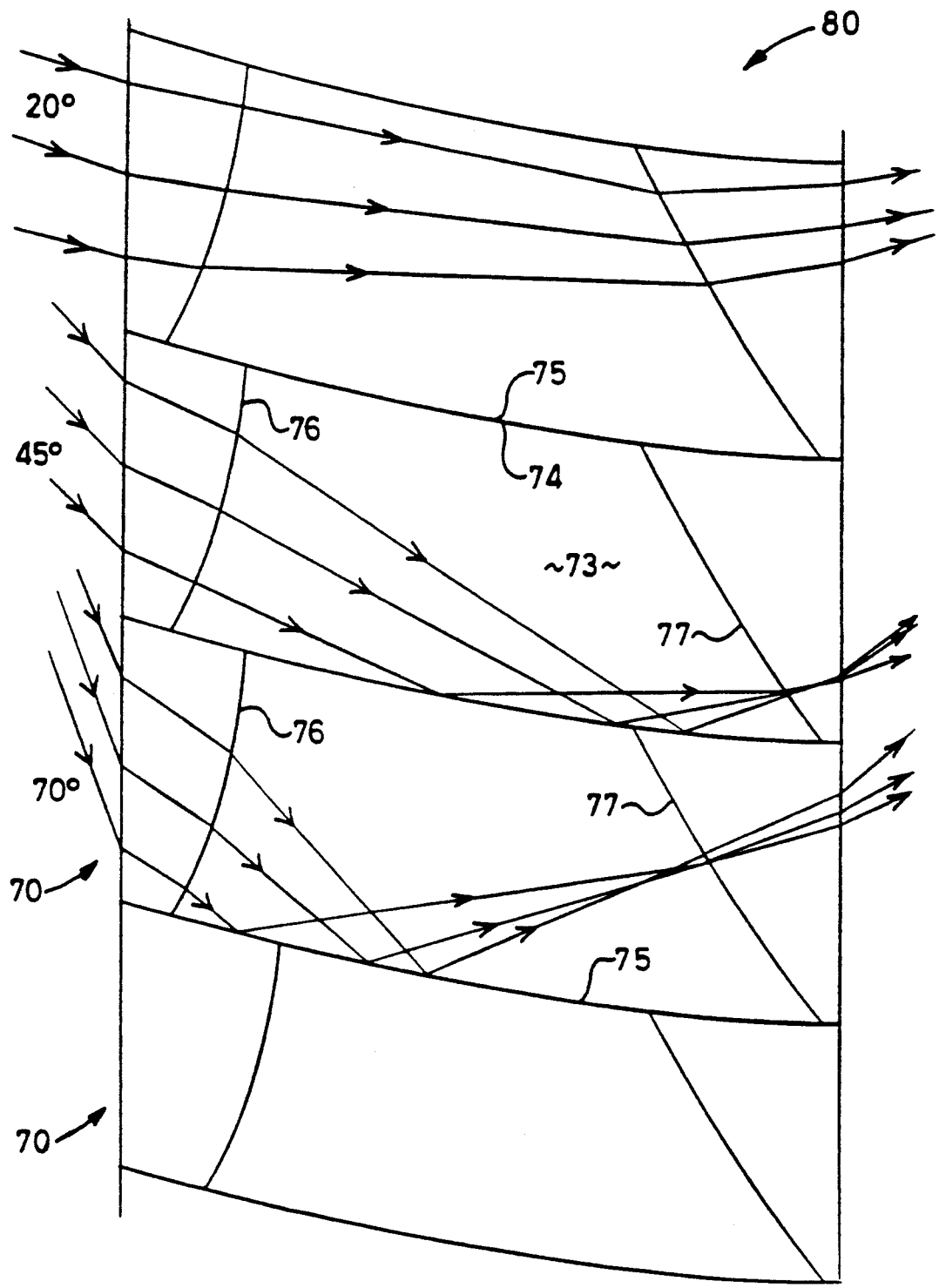
Figure 9:
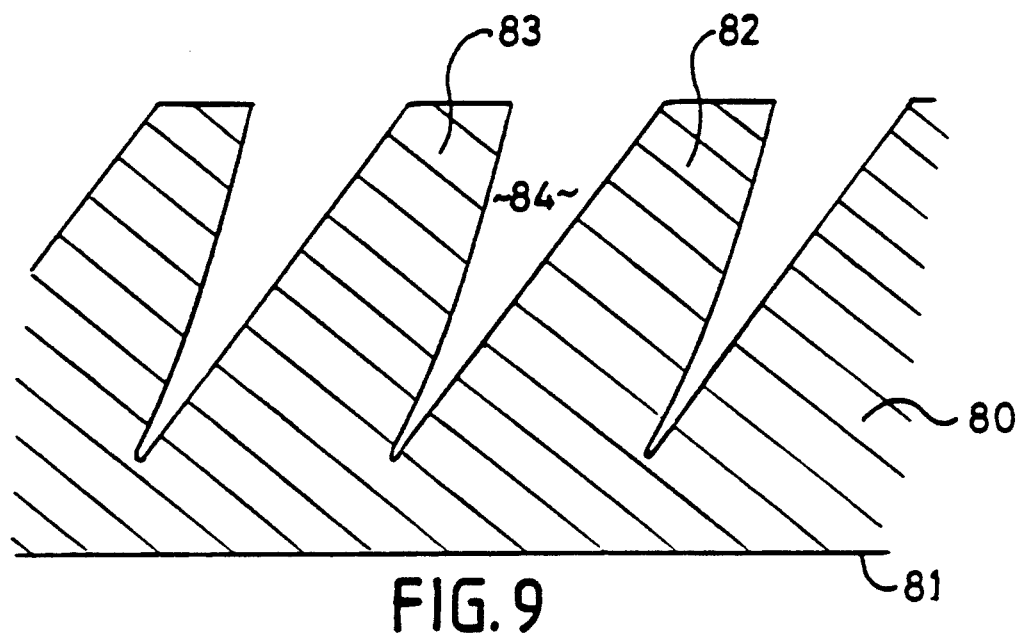
FIG. 9 is a cross sectional view of the incident side of a multiple element apparatus in accordance with the present invention.
Figure 10:
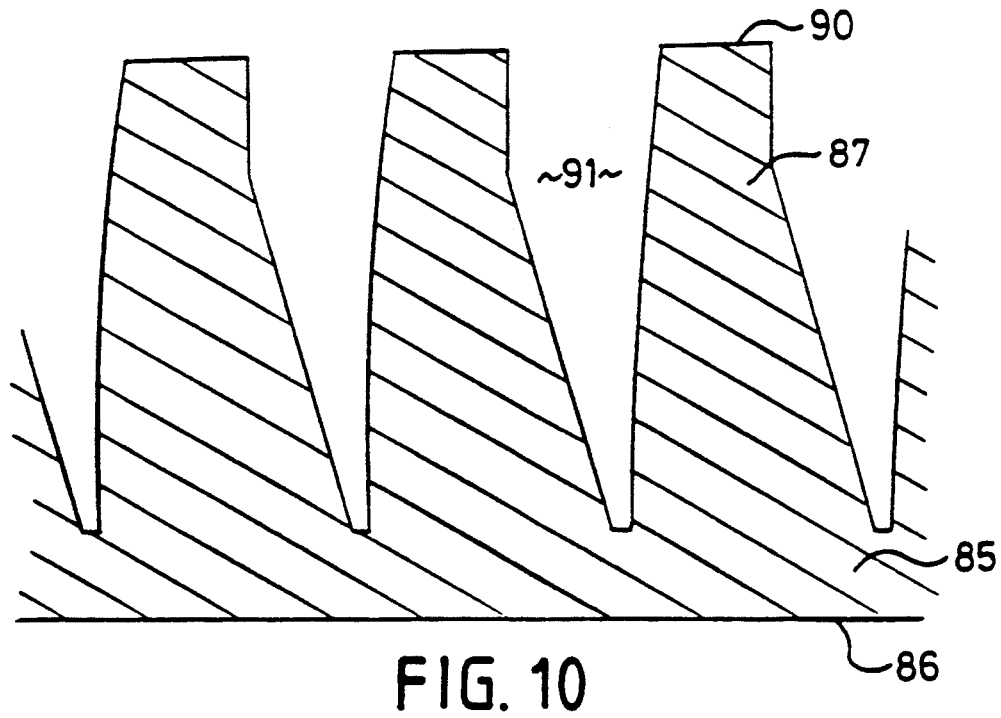
FIG. 10 is a cross sectional view of the emerging side of multiple element apparatus in accordance with the present invention.
Figure 11:
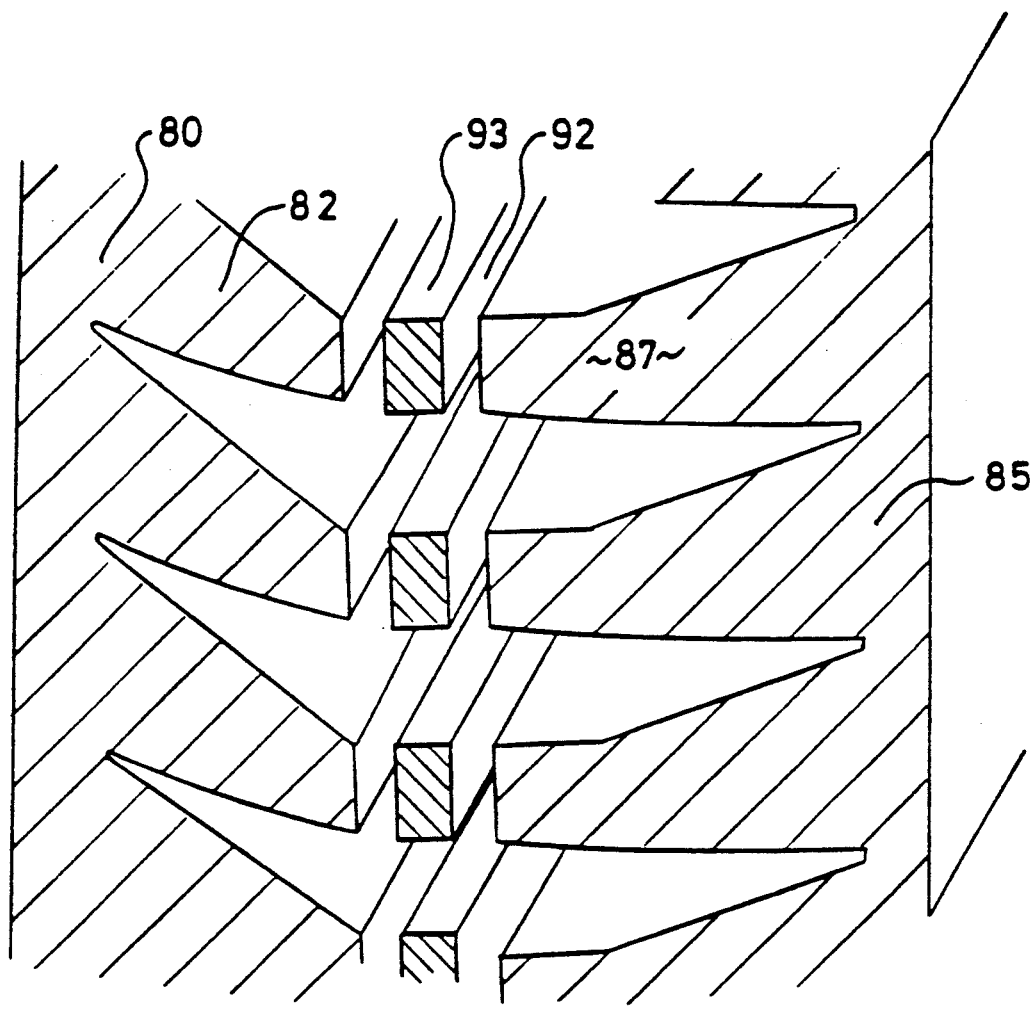
FIG. 11 is a cross section in perspective view of multiple element apparatus incorporating the elements of FIGS. 9 and 10.
Figure 12:
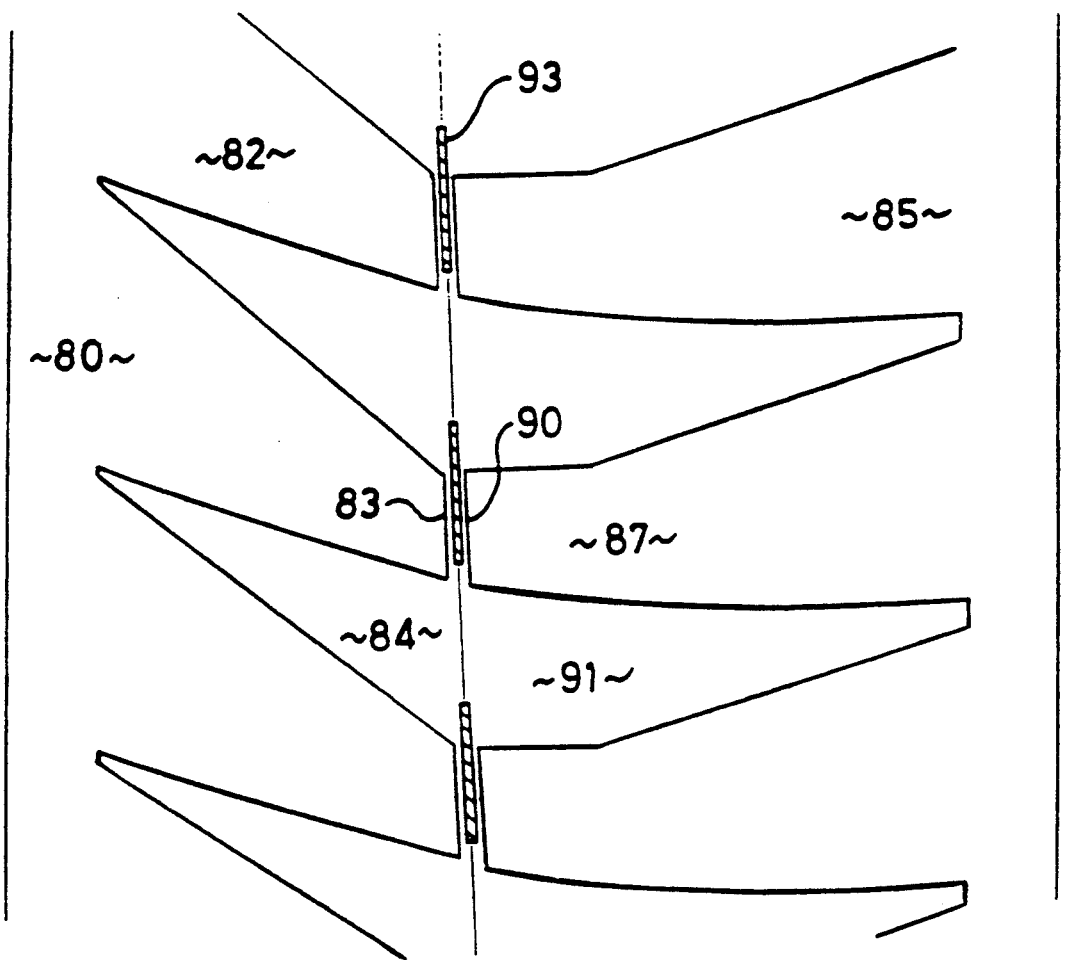
FIG. 12 illustrates an alternative embodiment to that illustrated in FIG. 11.
Figure 13:
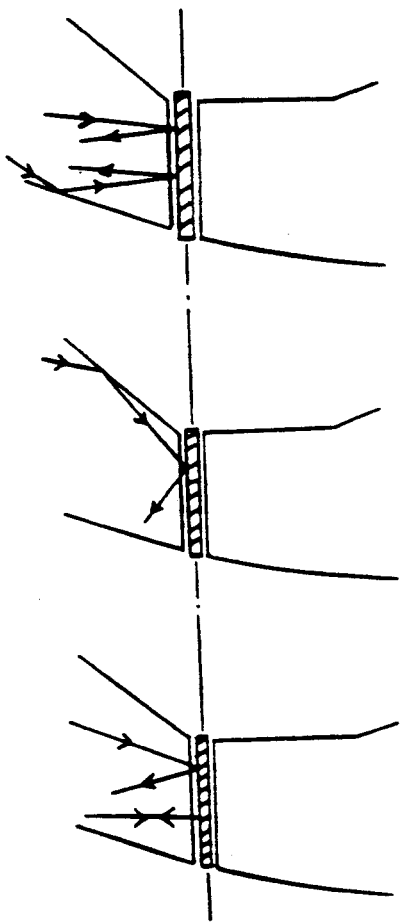
FIG. 13 is a detail cross sectional view of the apparatus of FIG. 12 illustrating a low light passage configuration thereof.
Figure 14:
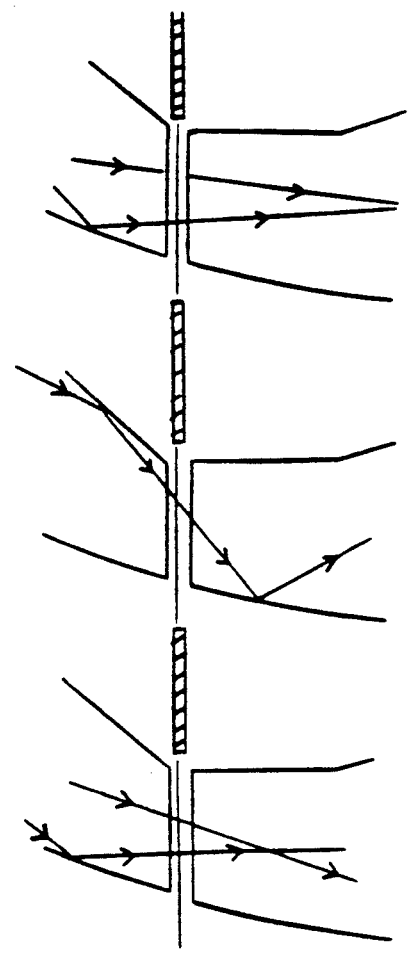
FIG. 14 is a detail cross sectional view of the apparatus of FIG. 12 illustrating a high light passage configuration thereof.

As illustrated in FIG. 8, a plurality of illuminating channels 70 may be joined together to form an illuminating assembly 80, the upper surface 74 of each channel 70 and the lower reflective surface 75 of the channel 70 above it being formed as opposed sides of a sheet of reflective material.

At a low angle of incidence, light passes more or less directly through the air cavity 73 to emerge with a degree of diffusion produced by the curvature of the faces 76 and 77. At higher angles of incidence, light deflects through the incident prism 71 onto the lower reflective surface 75, where its angle is changed substantially before it exits through the emergent prism 72.

In the embodiment of FIGS. 9 to 14 there is illustrated a multiple element apparatus including an incident member 80 having a substantially flat incident surface 81 adapted to be disposed towards the outside of for example a window. The incident member 80 is configured with appropriately shaped dielectric fingers 82 which extend away from the incident surface 81 and terminate in inner surfaces 83 which are preferably parallel to the incident surface 81. The space between the fingers 82 provides an air filled gap providing the boundary condition for total internal reflection within the fingers 82, directing light incident on the incident surface 81 through to emergence through the inner surface 83.

Mounted parallel to and spaced apart from the incident member 80 is an emergence member 85 having an emergent surface 86 substantially parallel to the incident surface 81 and disposed towards the interior of a room in use. The emergence member 85 is provided with fingers 87 having an inner surface 90 again preferably parallel to the inner surface 83 of the incident member 80. Between the fingers 87 are air filled gaps 91 adapted to provide the boundary conditions to permit total internal reflection of light passing through the inner surface 90 and resulting in light emerging through the emergent surface 86.

The incident member 80 and the emergence member 85 are relatively mounted such that a gap 92 is provided. The gap 92 providing a vertical channel bound through the centre of the assembly of the incident member 80 and the emergence member 85.

Disposed within the gap 92 are vertically spaced shutter members 93. Shutter members 93 are vertically moveable to be selectively interposed in the gap 92 between the inner surfaces 83 and 90 and the air filled gaps 84 and 91.

Of course it should be realised that shutter members may be discrete shutter members as illustrated in the drawings or may alternatively comprise a sheet of dielectric material having a plurality of shuttering regions provided thereon. In this alternative arrangement the sheet material may be of the same refractive index as the members 80 and 85 and may move in close proximity to the inner surfaces 83 and 90 such that the light pass is not disrupted by an undue number of boundaries between elements of differing refractive index.

In use light falling on the incident surface 81 of the incident member 80 is transmitted by total internal reflection bound to the inner surface 83 of the fingers 82 whereupon the amount of light passing the shutter members 93 and thence to the emergent surface 86 of the emergent member 85 is controlled by the relative position of the shutter members 93, relative to the inner surfaces 83 and 90.

Figure 15:
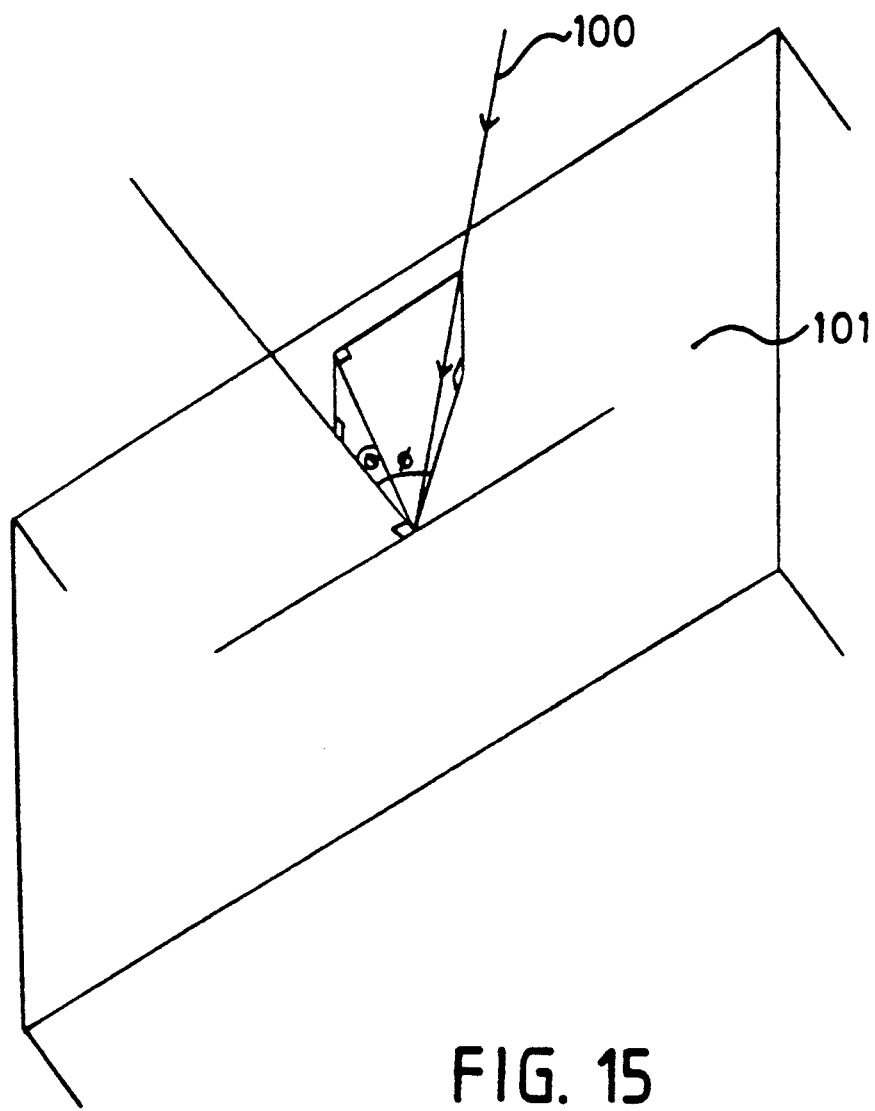
FIG. 15 is a diagrammatic representation of the components of incident light expected in use of apparatus in accordance with the present invention.

In FIG. 15 there is illustrated a section of the incident surface of typical apparatus and showing a selected incident ray 100 having an angle of elevation $\overline{O}$ and an oblique angle $\hat{U}$, both angles being measured from the line at zero degrees of incidence to the surface 101.

In order to ensure that the oblique component $\hat{U}$ is directed into the effective wave guide of the apparatus there are provided reflective grooves 102, the walls of the grooves providing a surface against which light having an oblique component $\hat{U}$ may be reflected into the wave guide portion 103 of the apparatus. Again in this embodiment the wave guide portion 103 is bounded by air gaps 104.

The grooves 102 are provided in the inner surface 105 of the incident skin 107, such that the incident and emergent surfaces of the apparatus are smooth and do not collect dust and the like.

Figure 18:
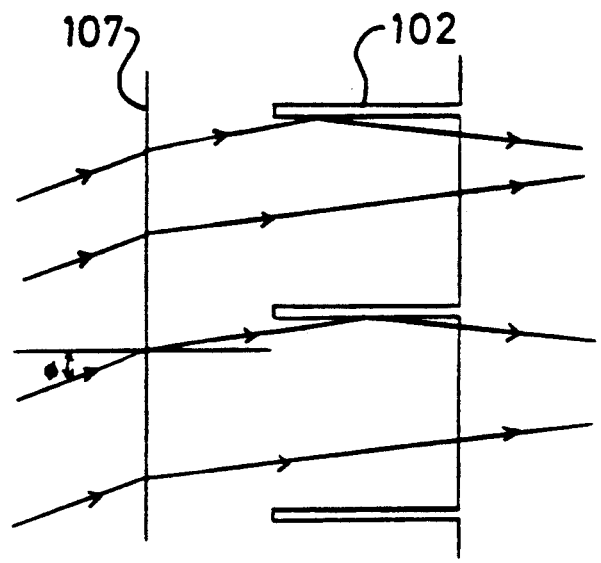
FIGS. 18 and 19 are alternate detail illustrations of the apparatus in accordance with that of FIG. 16.
Figure 19:
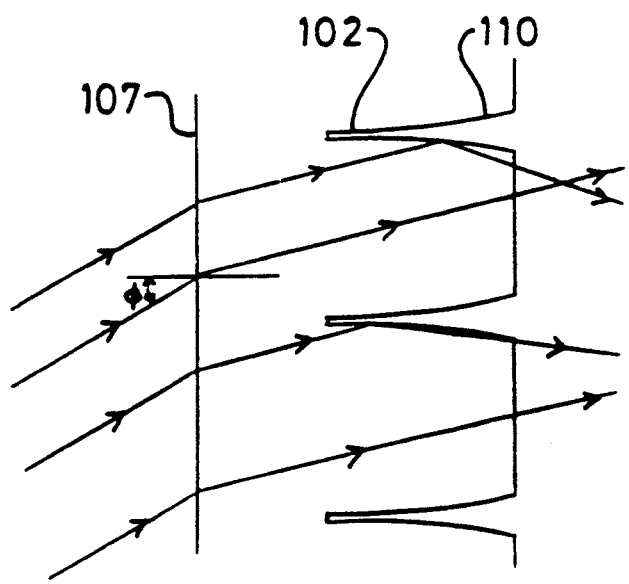

In the embodiment illustrated in detail in FIG. 18, the grooves are straight sided and therefore reflect parallel rays of light identically should the rays of light impinge upon the surface of the groove. However in order to improve performance it may be desirable to provide the grooves 102 with a divergent outer profile 110 to diffuse the oblique component $\hat{U}$ of incident light.

It will of course be realised that while the above has been given by way of illustrative example of this invention, all such and other modifications and variations thereto as would be apparent to persons skilled in the art are deemed to fall within the broad scope and ambit of this invention as defined in the Claims appended hereto.

The claims defining the invention are as follows:

1. Illuminating apparatus for transmitting incident light including a body member comprising:
   (A) an incident surface such that light incident thereon is refracted into the body member,
   (B) an emergent surface, and
   (C) a pair of substantially opposed air boundary surfaces disposed between and terminating adjacent said incident and emergent surfaces, said air boundary surfaces being configured such that substantially all light passing through said incident surface and impinging on one or more of the boundary surfaces is totally internally reflected therefrom to issue from said emergent surface in a direction inclined upwardly from the horizontal.

2. Illuminating apparatus according to claim 1, wherein said body member is formed of a material such that light incident on said incident surface at angles from 0° to 70° are refracted into said body member.

3. Illuminating apparatus according to claim 2, wherein said air boundary surfaces are configured such that light impinging on said incident surfaces at angles of incidence of from about 20° to 0° passes to said emergent surface without reflection from said air boundary surfaces and light impinging at angles of incidence of from about 20° to 70° is totally internally reflected therefrom to issue from said emergent surface in a direction inclined upwardly from the horizontal.

4. Illuminating apparatus according to claim 1, wherein said emergent surface is substantially parallel to said incident surface.

5. Illuminating apparatus according to claim 1 wherein said material is dielectric.

6. An illuminating assembly comprising a plurality of illuminating apparatus according to claim 1.

7. An illuminating assembly according to claim 6, wherein the air boundary surfaces of adjacent illuminating apparatus form opposed sides of a cavity between said adjacent illuminating apparatus.

8. An illuminating assembly according to claim 6, wherein said plurality of illuminating apparatus are integrally formed as a continuous sheet, the incident and emergent surfaces of said plurality of illuminating apparatus forming substantially contiguous surfaces respectively.

9. An illuminating assembly according to claim 8, wherein said contiguous surfaces are substantially vertical.

* * * * *